United States Patent [19]

Fornasari

[11] Patent Number: 4,819,868
[45] Date of Patent: Apr. 11, 1989

[54] ELECTROMECHANICAL DEVICE ASSOCIATED WITH THERMOACTUATORS FOR USE IN VEHICLE CLIMATE CONTROL AND AIR CONDITIONING SYSTEMS

[75] Inventor: Paolo Fornasari, Casale Monferrato, Italy

[73] Assignee: Eltek, S.p.A., Alessandria, Italy

[21] Appl. No.: 171,818

[22] Filed: Mar. 22, 1988

[30] Foreign Application Priority Data

May 29, 1987 [IT] Italy ................................. 67464 A/87

[51] Int. Cl.$^4$ ............................................. F24F 13/10
[52] U.S. Cl. ................................ 236/49.5; 236/68 C; 251/11
[58] Field of Search ................ 236/49 D, 68 C, 68 R, 236/84, 99 K, 100; 251/11

[56] References Cited

U.S. PATENT DOCUMENTS

| 2,509,334 | 5/1950 | Collins | 236/68 R |
| 3,298,658 | 1/1967 | Alzea | 251/11 |
| 3,317,135 | 5/1967 | Feinberg | 236/68 C |
| 3,684,170 | 8/1972 | Roof | 236/49 D X |
| 4,068,799 | 1/1978 | Brodin | 236/49 D |
| 4,753,271 | 6/1988 | Fornasari | 251/11 X |

Primary Examiner—William E. Tapolcai
Attorney, Agent, or Firm—Browdy and Neimark

[57] ABSTRACT

An electromechanical device for vehicle climate control and air conditioning systems. The valves in said systems are actuated by one or more plungers incorporated in electrothermoactuators associated with mechanisms which transmit and, if required, transform the linear movement generated by plungers causing the opening/closing of the system's valves.

4 Claims, 2 Drawing Sheets

ELECTROMECHANICAL DEVICE ASSOCIATED WITH THERMOACTUATORS FOR USE IN VEHICLE CLIMATE CONTROL AND AIR CONDITIONING SYSTEMS

DESCRIPTION

Current vehicle climate control and air conditioning systems comprise a cooling device and a heating device, as well as a valve to direct the air flow to one device or the other forcing said air flow through a radiator. The air flowing through the radiator can be controlled by a butterfly valve. The servo mechanisms controlling the valves responsible for the exchange of system fluids comprise small electric motors, potentiometers, and electronic control units that govern electric motors, which in turn actuate elements controlling one or more valves.

In another well-known version, said systems utilize solenoids powered by controlled voltage that generate, and transmit to corresponding valves linear movement of varying amplitude; said amplitude is delimited by the structure of the solenoids.

The devices hereinabove described are structurally complex, expensive, and heavy.

The object of the invention is to provide an electromechanical device, associated with thermoactuators, able to generate movement of an amplitude and power required to control the valves of said systems, thus eliminating electric motors and/or solenoids. Said device is highly reliable and durable.

In accordance with the principles of the invention, movement for the direct and/or indirect control of the climate control or air conditioning system valves is generated by one or more electrothermoactuators, associated with mechanical means suitable to transform and, if required, transmit movement from said thermoactuators to the system's valves; said systems are generally, but not exclusively, installed in motorized vehicles.

The applicant holds numerous patents relative to electrothermoactuable devices; the thermoactuators used in the present device are preferably those described in Italian Pat. application No. 67324-A/87 filed by the same inventor on Apr. 17, 1987.

The invention may be better understood from a reading of the following detailed description in conjunction with the drawings in which like reference designations indicate like parts and in which:

FIG. 1a illustrates in greater detail the lever assembly in a different position than in FIG. 1;

Figure 1:
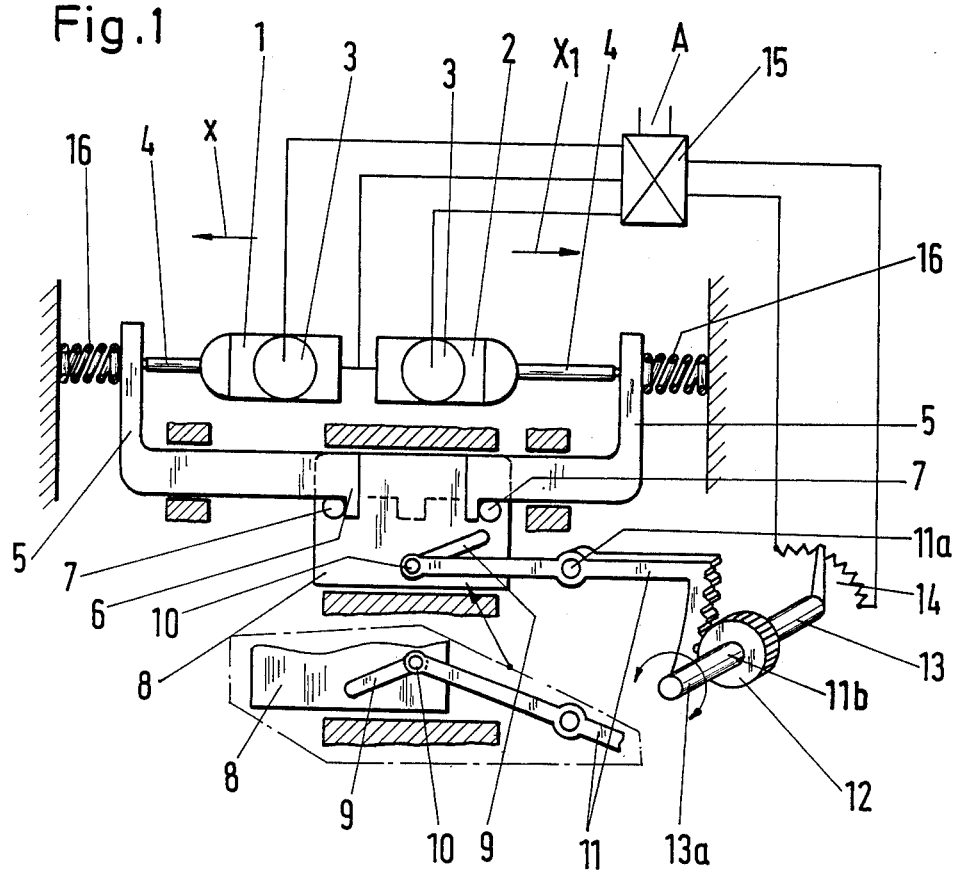
FIG. 1 illustrates one form of the device.

The device shown in FIG. 1 comprises thermoactuators 1 and 2; 3 indicates one or more heators associated internally and/or externally with the hermetically sealed casing of each thermoactuator. The corresponding plunger 4, preferably a cylindrical shaft, can move longitudinally in either direction with respect to the corresponding casing where it is housed, and is able to transmit power to one arm of a corresponding "L"-shaped part 5, against the reaction of calibrated elastic devices 16, forcing arm 5 and the corresponding plunger 4 back in the opposite direction of arrows -X-,-$X_1$- when the thrust coming from the inside of the casing of the relative thermoactuator ceases owing to the cessation of the voltage supplied to one or more heaters 3; the power supplied is governed by an electronic control unit 15 connected to electrical supply line -A- and a potentiometer 14.

Adjacent arms 5 are mounted in a mobile fashion in appropriate supports, each having a tooth 6 that interferes, unidirectionally and in opposing direction with respect to each other with corresponding stops 7 integral with plate 8 mounted in a mobile fashion parallel to arms 5. Said plate 8 incorporates an oblique slot 9 where linkage 10,11 is installed; the arm 11 of said linkage is hinged at 11a and ends with a rack 11b always engaged with a cogged pinion 12 integral with the shaft 13 of a potentiometer 14 connected electrically to electronic control unit 15.

Device operation is as follows. When heaters 3 of casing 2 are actuated, plunger 4 housed in said casing forces arm 5 against the reaction of spring 16 into the position shown in FIG. 1; linkage pin 10 moves into the position shown; it cannot return spontaneously from this position even when corresponding heaters 3 are no longer electrically excited because the inclination of slot 9 is such that it does not permit said linkage to move without the corresponding movement of plate 8. Under said conditions, spring 16 forces the corresponding arm 5 and plunger 4 back to the initial position (identical to that shown for casing 1, while linkage arm 11b forces both pinion 12 and potentiometer 14 connected to electronic control unit 15 to move in an angular fashion. Depending on the position of potentiometer 14, power is independently supplied, never at the same time, to the thermistors of one of the two thermoactuators 1,2. When electronic control unit 15 delivers power to thermoactuator 1, the linkage assumes the position illustrated in FIG. 1A. Springs 16 force back one plunger 4, or the other, by means of corresponding arms 5. Said plunger is immediately forced back into its casing as soon as power to either of the thermoactuators ceases to ensure that the cooling and consequent solidification of the waxy mass present in the casing does not prevent the plunger from reentering said casing. If power from electronic control unit 15 is interrupted, the linkage remains in the position it is at when power is interrupted; the same is true for potentiometer 14, while elastic devices 16, as can be seen, are responsible for forcing plungers 4 back to the resting position. It is essential that one of the two actuators 1,2 is active to obtain variations in the potentiometer forcing plate 8 to move activating the linkage 9, 10, 11.

The devices hereinabove described are illustrated schematically by box 17 in FIG. 2, and can be advantageously used to control, by means of part 13a of shaft 13, a butterfly valve 18 which, in climate control systems, controls the flow of air moving in the direction indicated by arrow -Y- through radiator 19 and is delivered in the direction -$Y_1$-. Box 20 represents a valve having the function of limiting or shutting off the flow of liquid entering radiator 19 for heat exchange.

Figure 2:
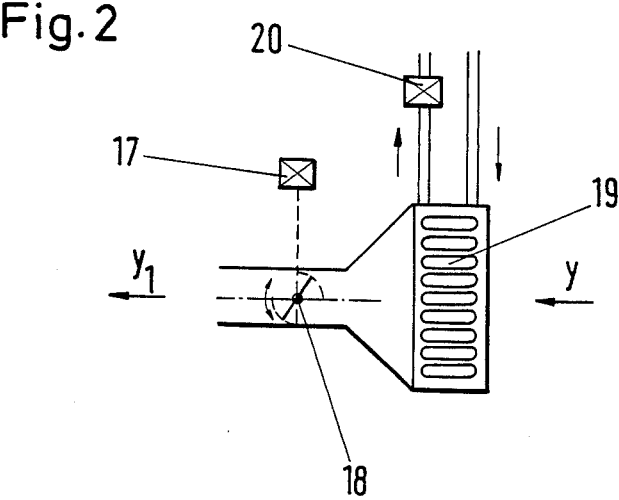
FIG. 2 illustrates an example of how the device can be used.
Figure 3:
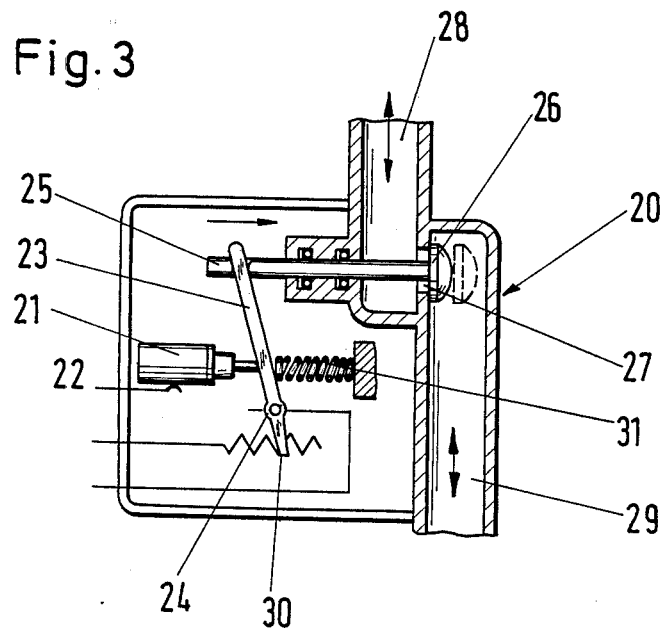
FIG. 3 illustrates a valve incorporated in said device.

Valve 20 indicated by a box in FIG. 2 is shown in greater detail in FIG. 3. In said valve, thermoactuator 21 is connected electrically at 22; the plunger 4 of said thermoactuator is able to act against a lever 23, hinged at 24; a calibrated spring exerts a force opposite to the plunger of actuator 21. One end of lever 23 is articulated to the stem of a poppet valve 26 that controls orifice 27 for the passage of liquids coming from branch 28 of a pipe and flowing into branch 29 connected to radiator 19 (figure 2). Said valve 20 can operate in an ON/OFF fashion or proportionally if associated with a potentiometer 30 connected at 31 with an electronic control unit 32 able to elaborate the signal and deliver a series of impulses of predetermined frequency or amplitude to actuator 21. The electronic unit's power can be supplied at varying frequencies or amplitudes depending on the intended use of the device, or by means of an ON/OFF impulse. Potentiometer 30 governs said control unit, which is able to elaborate the signal and send a series of impulses to actuator 21.

Figure 4:
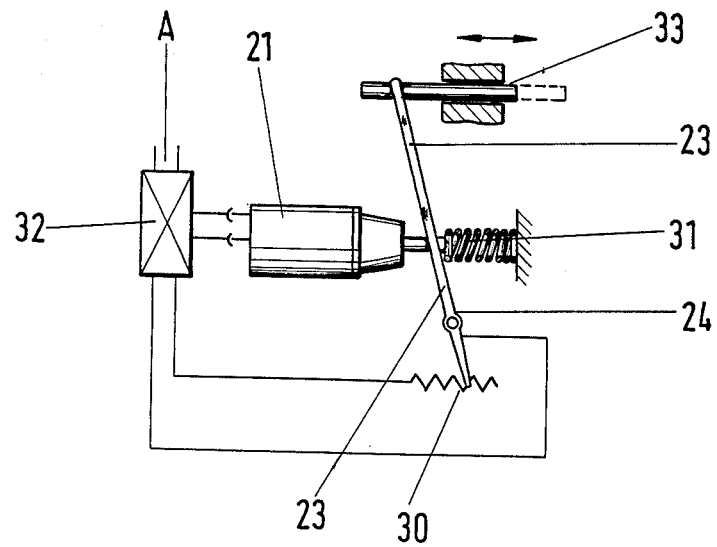
FIG. 4 illustrates in greater detail an aspect of FIG. 3 including a control device that can be associated with the invention.

In FIG. 4, lever 23 is articulated with a shaft 33 instead of a poppet valve. Said shaft travels in a linear fashion, which can be proportional if a potentiometer 30 is present connected to an electronic control unit 32, or operates in an ON/OFF mode if the control unit and potentiometer are not used. The movement of shaft 33 can control any type of valve used in the device by means of its movement.

The use of said device provides considerable economic and structural advantages, and is reliable and durable thanks to the simplicity of its components.

What is claimed is:

1. An electromechanical device associated with thermoactuators, particularly for the control of valves in vehicle climate control or air conditioning systems, comprising a pair of thermoactuators being associated with heaters; two "L"-shaped parts being mounted in a mobile fashion moving, against the reaction of calibrated springs, on a plate having stops interfering with teeth of said "L"-shaped parts; said plate being equipped with a slot engaging a sliding pin carried on one end of a mobile arm, said mobile arm having a curved rack on an opposite side of said mobile arm from said sliding pin, said curved rack always engaged by a pinion integral with a shaft incorporating a potentiometer electrically connected to an electronic control unit; said shaft having the function of controlling a butterfly valve, in turn controlling the flow of air exiting from a radiator of an air conditioning system.

2. An electromechanical device in accordance with claim 1, comprising a poppet valve controlling the passage of liquids coming from the system's radiator, characterized in that a stem of said valve is articulated at the end of a rocker lever that can be acted upon by a plunger of an electrothermoactuator, against the reaction of a spring; the other end of said lever controls a potentiometer electrically connected to an electronic control unit for the purpose of determining various valve positions with respect to an orifice controlled.

3. An electromechanical device in accordance with claim 1, comprising a poppet valve controlling the passage of liquids coming from the system's radiator, characterized in that the operation of the poppet valve is either ON or OFF as the thermoactuator has no potentiometer.

4. An electromechanical device in accordance with claim 1, characterized in that each thermoactuator is associated with at least one heater located internally or externally with respect to a casing enclosing wax with high thermal dilative properties.

* * * * *